US009709037B2

(12) United States Patent
Sagi et al.

(10) Patent No.: US 9,709,037 B2
(45) Date of Patent: Jul. 18, 2017

(54) SYSTEM AND METHOD FOR CONTROLLING WIND TURBINES IN WIND FARMS

(71) Applicant: GENERAL ELECTRIC COMPANY, Schenectady, NY (US)

(72) Inventors: Deepak Raj Sagi, Bangalore (IN); Avijit Saha, Bangalore (IN); Govardhan Ganireddy, Bangalore (IN); Mark Edward Cardinal, Schenectady, NY (US); Rajni Kant Burra, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 352 days.

(21) Appl. No.: 14/575,116

(22) Filed: Dec. 18, 2014

(65) Prior Publication Data

US 2015/0184632 A1 Jul. 2, 2015

(30) Foreign Application Priority Data

Dec. 26, 2013 (IN) .......................... 6082/CHE/2013

(51) Int. Cl.
*F03D 7/00* (2006.01)
*F03D 9/00* (2016.01)
(Continued)

(52) U.S. Cl.
CPC ............. *F03D 9/005* (2013.01); *F03D 7/028* (2013.01); *F03D 7/048* (2013.01); *F03D 9/11* (2016.05);
(Continued)

(58) Field of Classification Search
None
See application file for complete search history.

(56) References Cited

U.S. PATENT DOCUMENTS 7,372,173 B2 5/2008 Lutze et al.
7,941,246 B2 5/2011 Miller et al.
(Continued)

FOREIGN PATENT DOCUMENTS

WO 2013000474 A2 1/2013

OTHER PUBLICATIONS

Rodriguez-Amenedo et al., "Automatic generation control of a wind farm with variable speed wind turbines", Energy Conversion, IEEE Transactions on, vol. 17, Issue 2, pp. 279-284, Jun. 2002.

(Continued)

*Primary Examiner* — Ryan Jarrett
(74) *Attorney, Agent, or Firm* — GE Global Patent Operation; Douglas D. Zhang (57) ABSTRACT

A method for controlling a wind farm including a plurality of wind turbines is provided. The method includes computing an error between a farm-level base point power and a measured wind farm power, generating an aggregated farm-level active power set point for the wind farm based on the error and a frequency response set point, generating aggregated turbine-level active power set points based on the aggregated farm-level active power set point, transmitting the aggregated turbine-level active power set points, determining aero power set points and storage power set points for the respective wind turbines and energy storage elements of the respective wind turbines from the aggregated turbine-level active power set points, and controlling the plurality of wind turbines for delivering aero power based on the respective aero power set points and controlling the energy storage elements to provide storage power based on the respective storage power set points.

19 Claims, 5 Drawing Sheets

(51) Int. Cl.
*F03D 7/04* (2006.01)
*F03D 7/02* (2006.01)
*F03D 9/11* (2016.01)
*H02J 3/38* (2006.01)

(52) U.S. Cl.
CPC ... *F05B 2260/821* (2013.01); *F05B 2270/335* (2013.01); *H02J 3/386* (2013.01); *Y02E 10/723* (2013.01); *Y02E 10/763* (2013.01)

(56) References Cited

U.S. PATENT DOCUMENTS

| | | | |
|---|---|---|---|
| 8,008,804 | B2 | 8/2011 | Capp et al. |
| 8,301,311 | B2 | 10/2012 | Nelson |
| 2008/0195255 | A1 | 8/2008 | Lutze et al. |
| 2009/0055030 | A1* | 2/2009 | Mayor ............... F03D 7/0284 700/287 |
| 2010/0090532 | A1 | 4/2010 | Shelton et al. |
| 2011/0196692 | A1 | 8/2011 | Chavez, Jr. et al. |
| 2012/0049516 | A1 | 3/2012 | Viassolo |
| 2013/0217409 | A1 | 8/2013 | Bridges et al. |

OTHER PUBLICATIONS

Jalali, "DFIG Based Wind Turbine Contribution to System Frequency Control", Thesis presented to the University of Waterloo in fulfillment of the thesis requirement for the degree of Master of Applied Science in Electrical and Computer Engineering, pp. 1-92, 2011.

Antonishen et al., "A methodology to enable wind farm participation in automatic generation control using energy storage devices", Power and Energy Society General Meeting, 2012 IEEE, pp. 1-7, Jul. 2012.

Aho et al., "A Novel Active Power Control System for Wind Turbines Capable of AGC and Primary Response", American Institute of Aeronautics and Astronautics, pp. 1-10, 2013.

European Search Report and Opinion issued in connection with corresponding EP Application No. 14198956.6 on May 4, 2015.

* cited by examiner

SYSTEM AND METHOD FOR CONTROLLING WIND TURBINES IN WIND FARMS

BACKGROUND

Embodiments of the present invention generally relate to wind turbines and more particularly relate to a system and method for controlling wind turbines in wind farms.

Wind turbines are used to generate electrical power from wind energy. Multiple wind turbines may be coupled together to form a wind farm, and multiple wind farms may be coupled to a power grid. The wind farms are required to provide a committed output power to the power grid. However, due to constant fluctuations in wind speed and in load coupled to the power grid, a difference may occur between the power provided by the wind farm to the power grid and the committed output power. The difference leads to variations in a frequency at the power grid and may require additional wind farm resources for frequency regulation.

In order to overcome the variations in the frequency, wind farms use various frequency response techniques. One type of primary frequency response method includes operating wind turbines in respective wind farms in a curtailed mode during normal operational modes and operating the same wind turbines to provide additional power when frequency decreases or curtail the wind turbines further when frequency increases. However, operating the wind turbines in a curtailed mode during normal operational modes results in revenue losses.

In some situations, the above type of primary frequency response technique is insufficient to maintain a precise control of the frequency in the power grid and a second frequency response technique is employed to precisely control the frequency in the power grid. One example of a secondary frequency response is an automatic generation control embodiment including a centralized wind farm battery that provides additional power to the power grid to maintain the frequency. Such secondary systems lead to additional costs of the wind farm.

It would be desirable for wind farms to have an improved and more cost effective system and method to address frequency variations.

BRIEF DESCRIPTION

In one embodiment, a method for controlling a wind farm including a plurality of wind turbines is provided. The method includes computing an error between a farm-level base point power forecast and a measured farm-level active power, generating an aggregated farm-level active power set point for the wind farm based on the error and a frequency response set point, generating aggregated turbine-level active power set points for the plurality of wind turbines based on the aggregated farm-level active power set point; transmitting the aggregated turbine-level active power set points to the respective wind turbines, using the aggregated turbine-level active power set points for determining aero power set points for each of the plurality of wind turbines and storage power set points for energy storage elements coupled to each of the respective wind turbines, and using the aero power set points for controlling the respective wind turbines and the storage power set pints for controlling the respective energy storage elements.

In another embodiment, a system for controlling a wind farm including a plurality of wind turbines is provided. The system includes a wind farm controller for computing an error between a farm-level base point power forecast and a measured farm-level active power, generating an aggregated farm-level active power set point for the wind farm based on the error and a frequency response set point, generating aggregated turbine-level active power set points for the respective wind turbines based on the aggregated farm-level active power set point, and transmitting the aggregated turbine-level active power set points to the respective wind turbines. The system also includes wind turbine controllers for receiving the aggregated turbine-level active power set points, using the aggregated turbine-level active power set points for determining aero power set points for respective wind turbines and storage power set points for energy storage elements coupled to the respective wind turbines, and using the aero power set points for controlling the respective wind turbines and the storage power set points for controlling the energy storage elements coupled to the respective wind turbines.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit," "circuitry," "controller," and "processor" may include either a single component or a plurality of components, which are either active and/or passive and are connected or otherwise coupled together to provide the described function.

Embodiments of the present invention include a system and method for computing an error between a farm-level base point power forecast and a measured farm-level active power, generating an aggregated farm-level active power set point for the wind farm based on the error and a frequency response set point, generating aggregated turbine-level active power set points for the plurality of wind turbines based on the aggregated farm-level active power set point; transmitting the aggregated turbine-level active power set points to the respective wind turbines, using the aggregated turbine-level active power set points for determining aero power set points for each of the plurality of wind turbines and storage power set points for energy storage elements coupled to each of the respective wind turbines, and using the aero power set points for controlling the respective wind turbines and the storage power set pints for controlling the respective energy storage elements.

Figure 1:
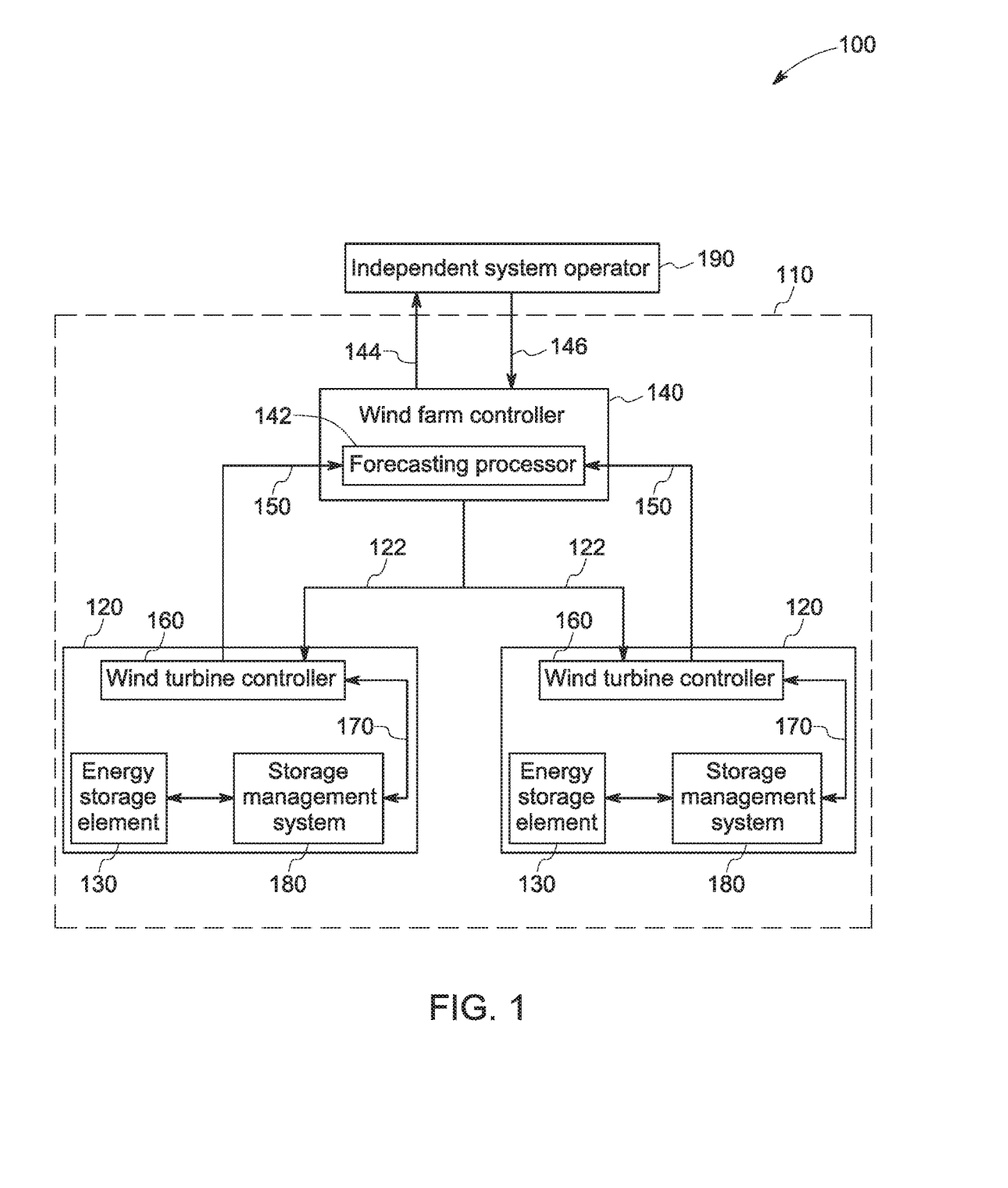
FIG. 1 is a block diagram representation of a wind farm including a system for controlling the wind farm in accordance with an embodiment of the invention.

FIG. 1 is a block diagram representation of a wind farm 100 including a system 110 for controlling the wind farm 100 in accordance with an embodiment of the invention. The wind farm 100 includes a plurality of wind turbines 120 for generating power in the wind farm 100. In one embodiment, the wind farm 100 comprises a distributed storage type wind farm, and at least some of the wind turbines 120 each include an integrated energy storage element 130 coupled thereto. The system 110 includes a wind farm controller 140 that controls a power generation of the wind farm 100. The wind farm controller 140 includes a forecasting processor 142 that generates a farm-level base point power forecast 144 for the wind farm 100. In one embodiment, the forecasting processor 142 receives turbine-level base point power forecasts 150 from the plurality of wind turbines 120 for generating the farm-level base point power forecast 144 by adding the turbine-level base point power forecasts 150. The plurality of wind turbines 120 include respective wind turbine controllers 160 that generate the turbine-level base point power forecasts 150 for each wind turbine 120 and transmit the turbine-level base point power forecasts 150 to the wind farm controller 140.

In one embodiment, the wind turbine controllers 160 generate the turbine-level base point power forecasts 150 based on aero power forecasts. An aero power forecast for a wind turbine 120 includes a forecast of wind power that may be generated by the wind turbine 120 using wind. In a specific embodiment, the aero power forecast is based on a historical aero power data and real time wind speed. In another embodiment, the wind turbine controller 160 uses a persistence method to determine the aero power forecast. The wind turbine controllers 160 further generate storage power forecasts based on states of charge of the respective energy storage elements 130. In one embodiment, a state of charge signal 170 is sent to the wind turbine controller 160 from a storage management system 180 in each wind turbine 120. The storage power forecast includes a forecast of power that may be provided by the energy storage element 130 of each wind turbine 120 based on the state of charge 170 of the respective energy storage element 130. The storage management system 180 may track the state of charge 170 of the energy storage element 130 based on a droop characteristic curve of the energy storage element 130, for example. In this example, the wind turbine controller 160 generates the storage power forecast based on a position of the state of charge 170 in the droop characteristic curve. In one embodiment, the droop characteristic curve of the energy storage element 130 may be determined based on a type of the energy storage element 130, a size of the wind farm 100, a rating of the energy storage element 130, and variability of the wind.

Figure 2:
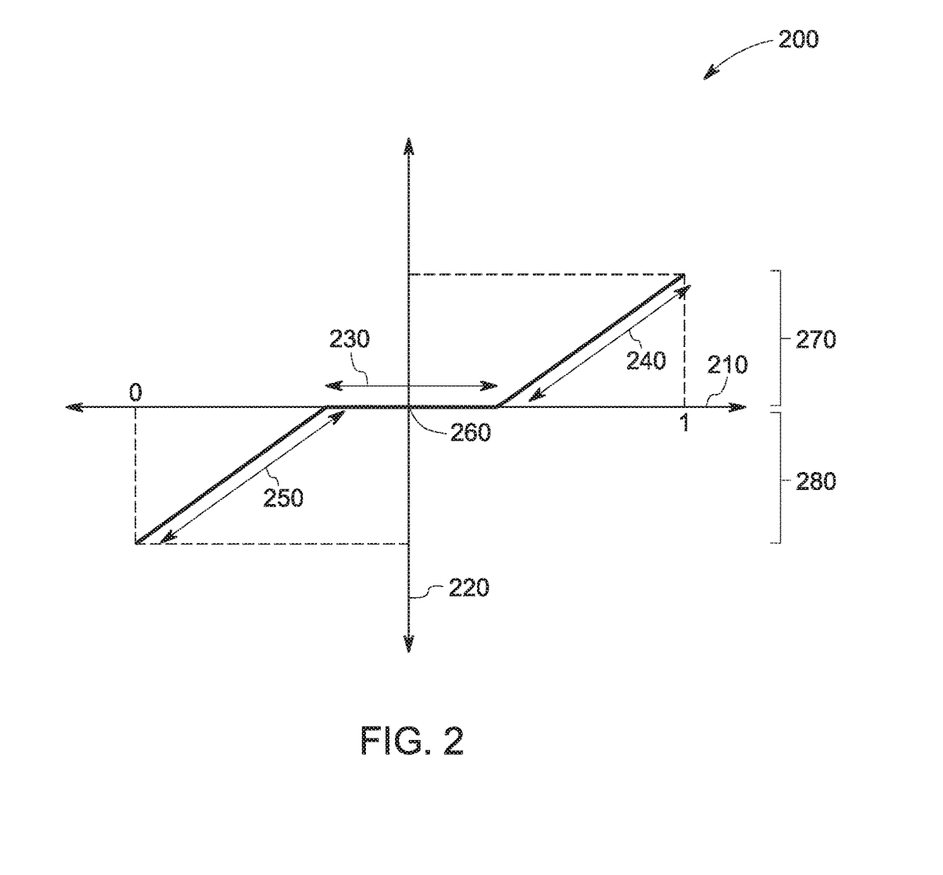
FIG. 2 is a graphical representation of a droop characteristic curve of a state of charge of an energy storage element in accordance with an embodiment of the invention.

Referring to FIG. 2, an exemplary graphical representation of an example droop characteristic curve 200 of the energy storage element 130 (FIG. 1) is shown in accordance with an embodiment of the invention. X-axis 210 represents a state of charge of the energy storage element. Y-axis 220 represents an offset power of the energy storage element. Curve 230 represents a dead band limit of the state of charge. The dead band limit may be defined a threshold range of the state of charge of the energy storage element. Slope 240 represents a positive offset slope, and slope 250 represents a negative offset slope. The positive offset slope represents a condition where the energy storage element may be discharged to provide storage power to a power grid (not shown). In contrast, the negative offset slope represents a condition where the energy storage element is capable of being charged by receiving power from the at least one wind turbine (FIG. 1). The energy storage element may be charged or discharged to reach a target state of charge represented by arrow 260. The target state of charge may be defined as a predefined position in the dead band limit at which, the state of charge of the energy storage element is desired to be maintained. In one embodiment, the target state of charge may be predetermined by a wind farm operator, and the energy storage element may be configured accordingly to operate based on the target state of charge. The wind turbine controller (FIG. 1) generates the storage power forecast and adjusts the turbine-level base point power forecast (FIG. 1) based on the storage power forecast. The storage power forecast may include a positive offset power 270 or a negative offset power 280 based on the position of the state of charge in the positive offset slope or the negative offset slope respectively. The wind turbine controller adjusts the turbine-level base point power forecast to either increase the turbine-level base point power forecast or decrease the turbine-level base point power forecast based on the positive offset power forecast or the negative offset power forecast respectively.

Figure 3:
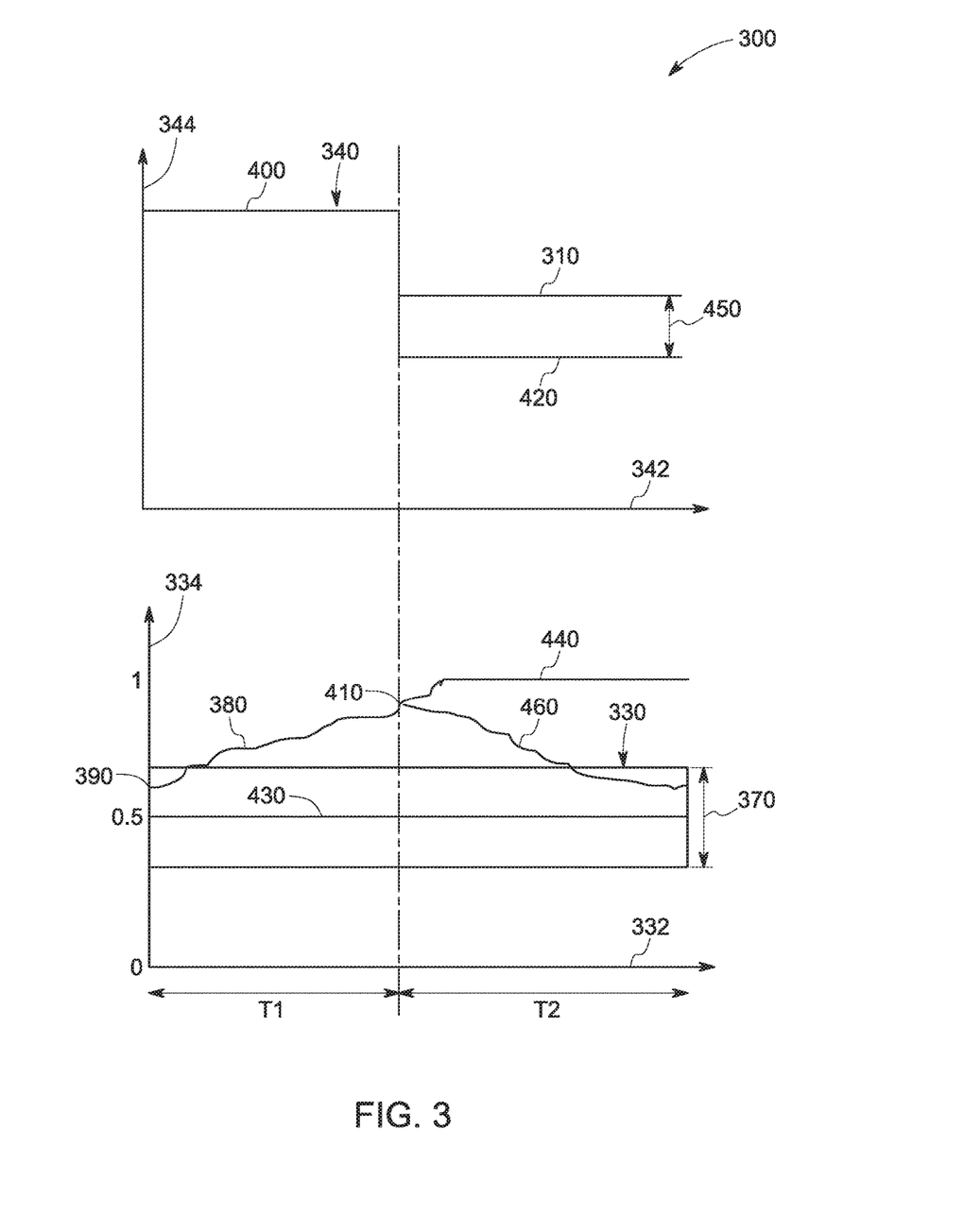
FIG. 3 an exemplary graphical representation of an adjusted turbine-level base point power forecast based on the position of the state of charge in the positive offset slope during time intervals T1 and T2 in accordance with an embodiment of the invention.

For example, FIG. 3 illustrates an exemplary graphical representation 300 of an adjusted turbine-level base point power forecast 310 based on the position of the state of charge in the positive offset slope (FIG. 2) during time intervals T1 and T2. The graphical representation 300 includes a graph 330 representing the state of charge of the energy storage element (FIG. 1) during time interval T1 and T2. The graphical representation 300 also includes a graph 340 corresponding to the graph 330 representing the turbine-level base point power forecast (FIG. 1) during time intervals T1 and T2. The graphs 330, 340 include an X-axis 332, 342 representing time. Y-axis 334 in the graph 330 represents the state of charge, and Y axis 344 in the graph 340 represents the turbine-level base point power forecast respectively. Section 370 represents the dead band limit of the state of charge. Curve 380 represents the state of charge relative to the time.

The wind turbine controller 160 (FIG. 1) receives a first value 390 representative of about zero point five (0.5) as the state of charge of the energy storage element at a beginning of the time interval T1. During the time interval T1, if a measured aero power of the at least one wind turbine (FIG. 1) is more than a first forecasted turbine-level base point power 400, the wind turbine controller (FIG. 1) computes a difference between the measured aero power and the first forecasted turbine-level base point power 400. The first forecasted turbine-level base point power 400 may be defined as a forecasted turbine-level base point power for the time interval T1. The wind turbine controller controls the energy storage element (FIG. 1) to receive a differential power between the measured aero power and the first forecasted turbine-level base point power 400. The energy storage element absorbs the differential power due to which the state of charge of the energy storage element increases from about zero point five (0.5) to a second value of about one (1) represented by reference numeral 410 at the end of time interval T1.

Simultaneously, the wind turbine controller generates a second turbine-level base point power forecast represented by reference numeral 420 for the time interval T2 in the corresponding graph 340. The wind turbine controller also obtains the state of charge of the energy storage element at the end of time interval T1. Since the value 410 representing the state of charge is about one (1), the wind turbine controller identifies that the position of the state of charge is in the positive offset slope, and the energy storage element may discharge to provide storage power. Hereinafter, the terms "value representing the state of charge" and "the position of the state of charge" are used interchangeably as the position of the state of charge is represented by the value representing the state of charge. The amount of storage power that may be provided by the energy storage element is computed based on a difference between a target state of charge 430 and a current state of charge represented by the position of the state of charge. Additionally, as the state of charge of the energy storage element is one (1), the energy storage element has reached a saturation condition represented by curve 440. The saturation condition may be defined as a condition in which, the energy storage element has reached a storage power saturation limit and will be unable to further store the differential power that may be received by the energy storage element during the time interval T2. Therefore, the wind turbine controller (FIG. 1) adjusts the second turbine-level base point power forecast 420 such that the offset power 450 may be included in the second turbine-level base point power forecast 420. Such addition of the storage power increases the second turbine-level base point power forecast 420 and results in the adjusted second turbine-level base point power forecast 310 for the time interval T2 represented by in the corresponding graph 340. During the time interval T2, the at least one wind turbine (FIG. 1) provides the storage power in addition to the measured power to the power grid by discharging the energy storage element and reduces the state of charge from the value 410 towards the section 370 of dead band limit represented by the curve 460. Similarly, the process may be repeated continuously to maintain the state of charge within the dead band limit and more particularly, at the target state of charge.

With continued reference to FIG. 1, the forecasting processor 142 in the wind farm controller 140 receives the turbine-level base point power forecasts 150 from the plurality of wind turbines 120 and generates the farm-level base point power forecast 144. The wind farm controller 140 may transmit the farm-level base point power forecast 144 to an independent system operator 190. The wind farm controller 140 further computes an error between the farm-level base point power forecast 144 and a measured farm-level active power. The wind farm controller 140 may further receive a frequency response set point 146 for automatic generation control from the independent system operator 190. The frequency response set point 146 may include a set point for generating a required power to maintain a frequency in the power grid. The wind farm controller 140 generates an aggregated farm-level active power set point based on the error and the frequency response set point 146 for the wind farm 100. In one embodiment, the aggregated farm-level active power set point may be generated based on the turbine-level base point power forecasts 150, the frequency response set point 146 and the error. In such embodiments, the aggregated farm-level active power set point may be generated based on the turbine-level base point power forecast generated for a time interval (T), the frequency response set point received from the independent system operator in time interval (T), and the error determined between the measured farm-level active power in time interval (T) and the farm-level base point power forecast generated in a previous time interval (T-1). In one embodiment, the aggregated farm-level active power set point may include new set points for the wind farm 100 to provide the required power for the automatic generation control The wind farm controller 140 computes aggregated turbine-level active power set points 122 for the wind turbines 120 from the aggregated farm-level active power set point by using a distribution logic which may be based on the turbine-level base point power forecasts and respective power rating of the wind turbines. The wind farm controller 140 transmits each aggregated turbine-level active power set point 122 to the respective wind turbine controller 160 of the respective wind turbines 120. The wind turbine controllers 160 use the aggregated turbine-level active power set points 122 to determine aero power set points for the respective wind turbines 120 and storage power set points for the energy storage elements 130 coupled to the respective wind turbines 120.

Figure 4:
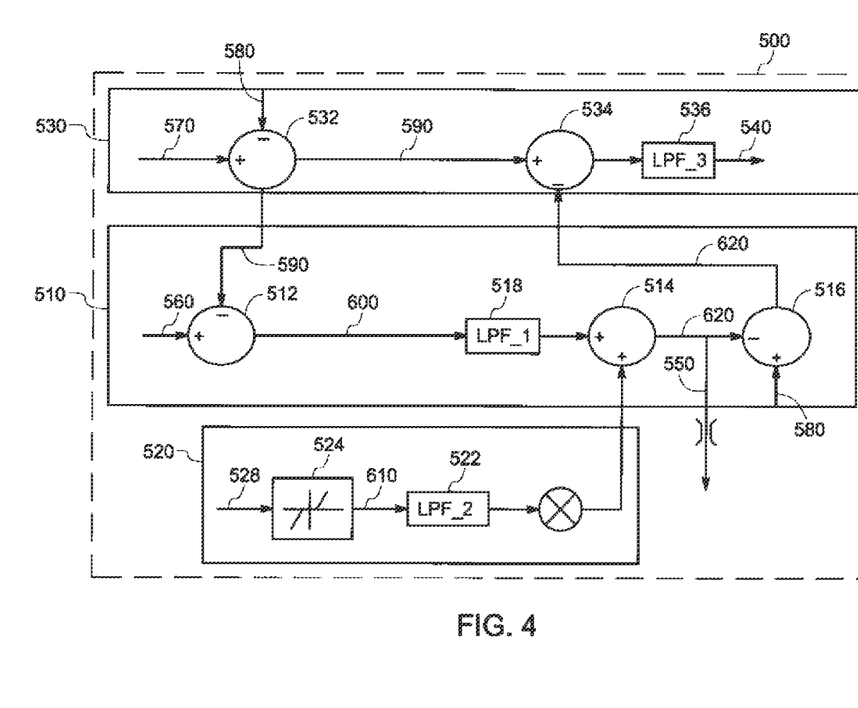
FIG. 4 is a diagrammatic representation of a control system in a wind turbine controller in accordance with an embodiment of the invention.

FIG. 4 is a schematic representation of a control system 500 in the wind turbine controller (FIG. 1) in accordance with an embodiment of the invention. The control system 500 includes a wind turbine module 510, a storage power module 520 and an aero power module 530. The control system 500 controls the respective wind turbine (FIG. 1) to generate aero power based on the aero power set point 540; and controls the energy storage element (FIG. 1) to provide the storage power based on the storage power set point 550 received from the wind turbine module 510.

The wind turbine module 510 includes a first wind summation block 512, a second wind summation block 514, a third wind summation block 516, and a first low pass filter 518. The storage power module 520 includes a second low pass filter 522, a state of charge management system 524 including a droop characteristic curve. The aero module 530 includes a first aero summation block 532, a second aero summation block 534, and a third low pass filter 536. The first low pas filter 518, the second low pass filter 522, and the third low pass filter 536 may be configured to include a first time delay, a second time delay and a third time delay respectively. In one embodiment, the first time delay, the second time delay, and the third time delay are provided such that the first time delay is the lowest, the third time delay is the highest, and the second time delay is between the first time delay and the third time delay which may be represented as $T_{LPF1}<T_{LPF2}<T_{LPF3}$, where T represents time delay. The first low pass filter 518, the second low pass filter 522, and the third low pass filter 536 enable a sequential operation of the wind turbine module 510, the storage power module 520, and the aero power module 530 to first generate a wind turbine error followed by the storage power set point 550 and the aero power set point 540.

The wind turbine module 510 receives a respective aggregated turbine-level active power set point 560 from the wind farm controller (FIG. 1) and feeds the aggregated turbine-level active power set point 560 to the first wind summation block 512. Moreover, the aero power module 530 is configured to continuously measure a turbine power that may be provided by the wind turbine (FIG. 1). In one embodiment, the aero power module 530 is configured to compute an aero power generated by the wind turbine (FIG. 1). The aero power module 530 obtains a value 570 representative of the measured turbine power from the wind turbine. The value 570 representative of the measured turbine power is fed to the first aero summation block 532. In one embodiment, the value 570 representative of the measured turbine power includes a value of aero power that may be provided by the wind turbine and a value of storage power that may be provided by the energy storage element. In this embodiment, the first aero summation block 532 also receives a value 580 measured at the DC/DC chopper which may include the storage power being provided by the energy storage element and DC/DC chopper losses. The first aero summation block 532 is configured to subtract the value 580 representative of the DC/DC chopper power from the value 570 representative of the measured turbine power to obtain an aero power 590. The aero power 590 is fed to the first wind summation block 512 in the wind turbine module 510. The first wind summation block 512 is configured to compute an active power difference 600 between the aero power 590 and the turbine-level active power set point 560. The active power difference 600 is transmitted to the first low pass filter 518 which further transmits the active power difference 600 to the second wind summation block 514. The first low pass filter 518 includes a threshold value of the active power difference 600 and filters signals representative of the active power difference 600 based on the threshold value of the active power difference 600.

Based on the second time delay included in the second low pass filter 522, the state of charge management system 524 in the storage power module 520 determines a state of charge 528 of the energy storage element. The state of charge management system 524 computes a value 610 representative of the storage power that may be provided by the energy storage element based on the state of charge 528 from the droop characteristic curve and transmits the value 610 representative of the storage power to the second wind summation block 514 through the second low pass filter 522 to maintain the second time delay.

The second wind summation block 514 compares the active power difference 600 and the value 610 representative of the storage power to determine if the energy storage element is capable of providing the storage power 610 required to compensate the active power difference 600. The value 610 representative of the storage power is used to generate the storage power set point represented by 550 and is further transmitted to the third wind summation block 516.

The third wind summation block 516 also receives the DC/DC chopper power 580 and computes a difference between the DC/DC chopper power 580 and the value 610 representative of the storage power to determine an active power error 620. The active power error 620 may include an error in active power that may be provided by the wind turbine to the wind farm. The active power error 620 may include an additional power (positive error) that may be received from the wind farm or a deficit in power (negative error) that may be provided to the wind farm for compensating the active power error 600. The second aero summation block 534 receives the aero power 590 from the first aero summation block 532 and the value 620 representative of the active power error. The second aero summation block 534 computes a difference between the aero power 590 and the active power error 620 to determine the aero power set point 540 for the wind turbine to generate aero power.

Figure 5:
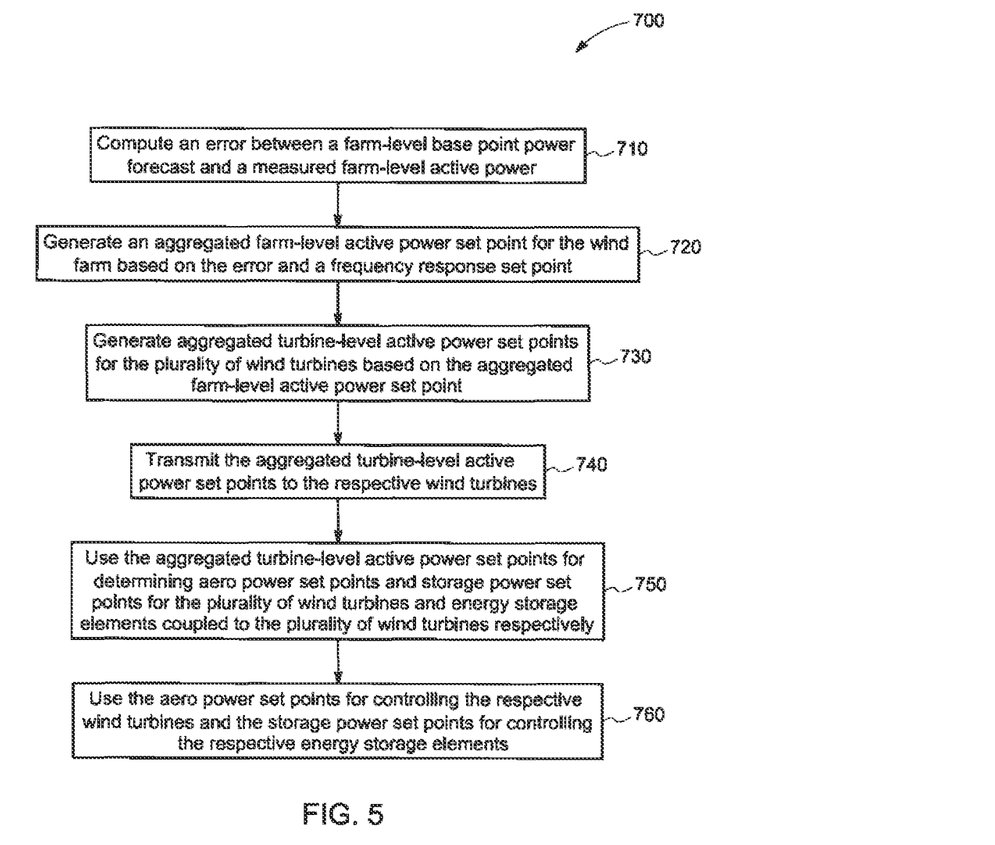
FIG. 5 is a flow chart representing steps involved in a method for controlling a wind farm in accordance with an embodiment of the invention.

FIG. 5 is a flow chart representing steps involved in a method 700 for controlling a wind farm including a plurality of wind turbines in accordance with an embodiment of the invention. The method 700 includes computing an error between a farm-level base point power forecast and a measured farm-level active power in step 710. In one embodiment, the farm-level base point power is forecasted by generating a plurality of a turbine-level base point power forecast for the plurality of wind turbines in the wind farm prior to computing the error. In a specific embodiment, the turbine-level base point power forecasts of the plurality of a wind turbines is adjusted based on states of charge of the energy storage elements coupled to the respective wind turbines. In a more specific embodiment, the turbine-level base point power forecasts are adjusted to maintain the states of charge within a dead band limit. In one embodiment, the states of charge are determined based on droop characteristic curves of the respective energy storage elements. The method 700 also includes generating an aggregated farm-level active power set point for the wind farm based on the error and a frequency response set point in step 720. In one embodiment, the frequency response set point for the wind farm is received from an independent system operator for an automatic generation control. The method 700 further includes generating aggregated turbine-level active power set points for the plurality of wind turbines based on the aggregated farm-level active power set point in step 730.

The method 700 also includes transmitting the aggregated turbine-level active power set points to the respective wind turbines in step 740. The method 700 further includes determining aero power set points and storage power set points for the plurality of wind turbines and the energy storage elements coupled to the plurality of wind turbines respectively by using the aggregated turbine-level active power set points in step 750. In one embodiment, the storage power set points are determined prior to determining the aero power set points. In a specific embodiment, active power differences are determined between the aggregated turbine-level active power set points and aero powers of the wind turbines. In a more specific embodiment, the active power differences are adjusted based on states of charge of the energy storage elements to generate the storage power set points. In another embodiment, the aero power set points are determined by determining an active power error between the storage power set points and a DC/DC chopper power. The method 700 further includes using the aero power set points for controlling the respective wind turbines and the storage power set points for controlling the respective energy storage elements in step 760.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling a wind farm comprising a plurality of wind turbines, the method comprising:
   computing an error between a farm-level base point power forecast and a measured farm-level active power;
   generating an aggregated farm-level active power set point for the wind farm based on the error and a frequency response set point;
   generating aggregated turbine-level active power set points for the plurality of wind turbines based on the aggregated farm-level active power set point;
   transmitting the aggregated turbine-level active power set points to the respective wind turbines;
   using the aggregated turbine-level active power set points for determining aero power set points and storage power set points for the plurality of wind turbines and energy storage elements coupled to the plurality of wind turbines respectively; and
   using the aero power set points for controlling the respective wind turbines and the storage power set points for controlling the respective energy storage elements.

2. The method of claim 1, further comprising, prior to computing the error, forecasting the farm-level base point power for the wind farm by generating a plurality of turbine-level base point power forecasts for the plurality of wind turbines in the wind farm.

3. The method of claim 2, wherein generating the plurality of turbine-level base point power forecasts further comprises adjusting the plurality of turbine-level base point power forecasts based on states of charge of the energy storage elements coupled to the respective wind turbines.

4. The method of claim 3, wherein adjusting the plurality of turbine-level base point power forecasts comprises adjusting the turbine-level base point power forecasts to maintain the states of charge of the energy storage elements within a dead band limit.

5. The method of claim 1, wherein generating the aggregated farm-level active power set point for the wind farm further comprises generating the aggregated farm-level active power set point for the wind farm based on a plurality of turbine-level base point power forecast.

6. The method of claim 1, further comprising receiving the frequency response set point from an independent system operator for an automatic generation control.

7. The method of claim 1, wherein the storage power set points are determined prior to determining the aero power set points.

8. The method of claim 7, wherein determining the storage power set points comprises determining active power differences between the aggregated turbine-level active power set points and aero powers of the plurality of wind turbines.

9. The method of claim 8, further comprising adjusting the active power differences based on states of charge of the energy storage elements.

10. The method of claim 7, wherein determining the aero power set points comprises determining an active power error between the storage power set points and a DC/DC chopper power.

11. A system for controlling a wind farm including a plurality of wind turbines, the system comprising:
    a wind farm controller for:
       computing an error between a farm-level base point power forecast and a measured farm-level active power;
       generating an aggregated farm-level active power set point for the wind farm based on the error and a frequency response set point;
       generating aggregated turbine-level active power set points for the plurality of wind turbines based on the aggregated farm-level active power set point;
       transmitting the aggregated turbine-level active power set points to the respective wind turbines;
    wind turbine controllers for:
       receiving the aggregated turbine-level active power set points;
       using the aggregated turbine-level active power set points for determining aero power set points for the respective wind turbines and storage power set points for energy storage elements coupled to the respective wind turbines; and
       using the aero power set points for controlling the respective wind turbines and the storage power set points for controlling the energy storage elements coupled to the respective wind turbines.

12. The system of claim 11, further comprising a forecasting processor for generating a farm-level base point power forecast for the wind farm.

13. The system of claim 11, wherein the wind turbine controllers are configured for transmitting individual turbine-level base point power forecasts to a forecasting processor for generating the farm-level base point power forecast.

14. The system of claim 13, wherein the wind turbine controllers adjust the individual turbine-level base point power forecasts based on states of charge of the respective energy storage elements.

15. The system of claim 14, further comprising storage management systems for determining the states of charge of the energy storage elements.

16. The system of claim 11, wherein the wind turbine controllers comprise aero power modules for computing aero powers generated by the respective wind turbines.

17. The system of claim 16, wherein the wind turbine controllers determine active power differences between each of the aero power and the respective aggregated turbine-level active power set points to generate the storage power set points.

18. The system of claim 17, wherein the wind turbine controllers are configured to receive states of charge of the respective energy storage elements and adjust the active power differences based on droop characteristics of the respective energy storage elements.

19. The system of claim 11, wherein the wind farm comprises a distributed storage wind farm and wherein each of the plurality of wind turbines comprises an integrated energy storage element.

* * * * *